United States Patent Office 3,123,442
Patented Mar. 3, 1964

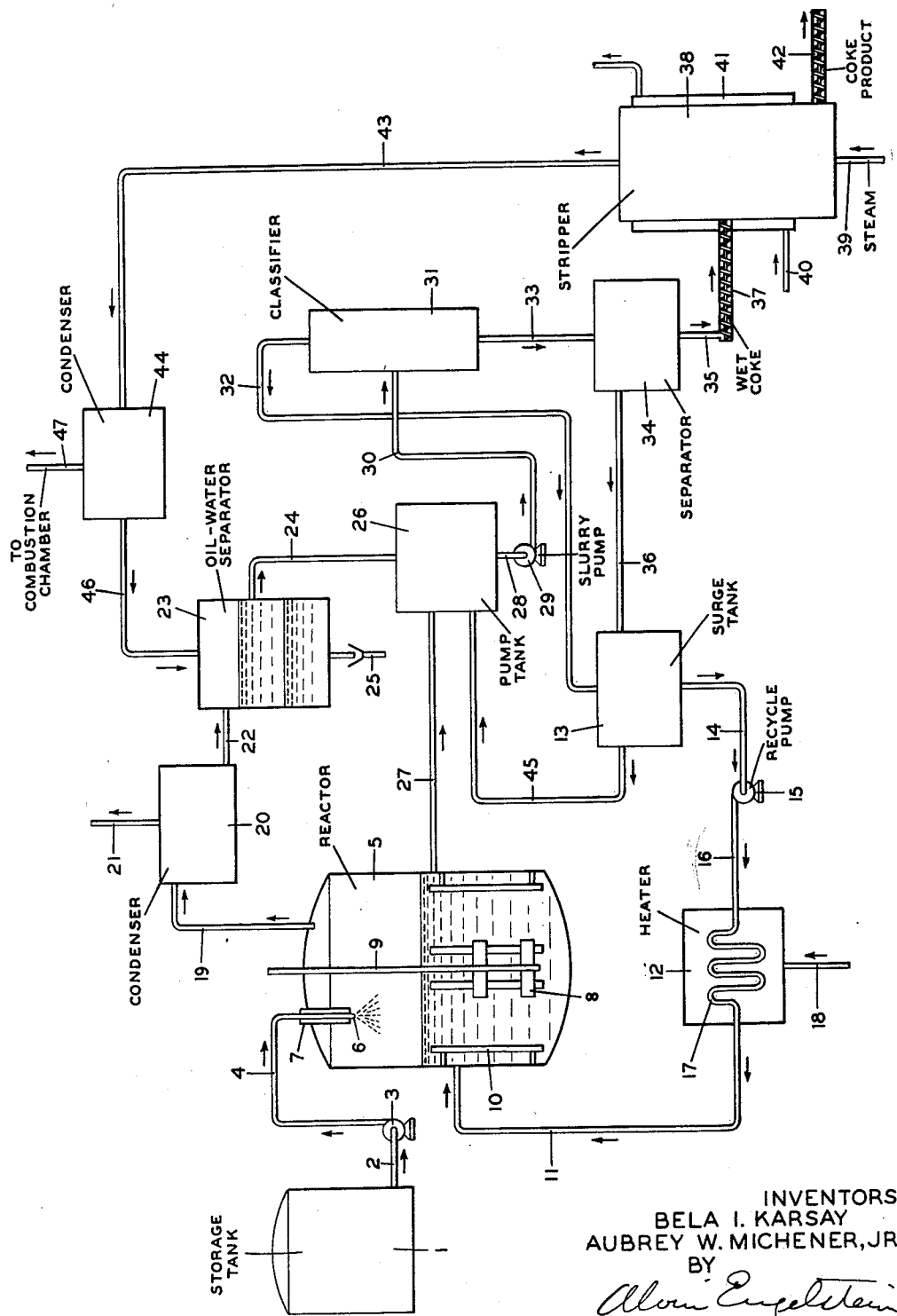

3,123,442
PROCESS FOR DECOMPOSITION OF SULFURIC ACID WASTE MATERIALS
Bela I. Karsay, East Orange, and Aubrey W. Michener, Jr., Rockaway, N.J., assignors to Allied Chemical Corporation, New York, N.Y., a corporation of New York
Filed Feb. 7, 1962, Ser. No. 171,692
4 Claims. (Cl. 23—177)

This invention relates to treatment of sulfuric acid waste material, and more particularly to a new and improved process for the chemical decomposition of such waste material for the recovery of high purity sulfur dioxide.

Sulfuric acid waste results from the treatment of hydrocarbons with strong sulfuric acid or oleum. In the coal and petroleum industries particularly, distillation products are treated to remove impurities, such as sulfur compounds, unsaturated hydrocarbons, gum-like and asphaltic material which cause corrosion, deterioration, unsuitable color and odor. Sulfuric acid treatment of these distillates is probably the most widely used method of chemical treatment. It either dissolves or reacts with all constituents of petroleum which cause corrosion, formation of gum, etc. It reacts with or dissolves sulfur compounds, precipitates resinous and tar-like material, improves the color, stability, and to some extent it improves the odor of the products and dissolves the naphthenic acids and nitrogen bases. Sulfuric acid also reacts with aromatic compounds present in all crude oil fractions to form a wide variety of sulfonic acids. The type and composition of acid waste material varies considerably and depends largely on the product being treated. Sulfuric acid treatment of petroleum fractions for products such as naphtha, kerosene, gas oils, and lubricating oils forms a viscous mass of high specific gravity which is not soluble in the treated product and precipitates therefrom in the form of the so-called "acid sludge." Treatment of oils and chemicals used in the manufacture of detergents and other organic products results in waste materials having high sulfuric acid content and compose the group commonly known as "spent acids." "Alkylation acid" typically results from the treatment of olefinic and isoparaffinic mixtures in the production of high octane fuels and contains still larger percentages of sulfuric acid. As hereinafter used, the terms "sulfuric acid waste material," and "acid waste" and the like, shall include acid sludge, spent acid, alkylation acid, and mixtures thereof, the individual terms being used to designate the particular type of acid waste.

Generally, acid waste material contains substantial amounts of free sulfuric acid diluted by organic reaction products of sulfuric acid such as the sulfonic acids, and a variety of hydrocarbons such as organic sulfides, polysulfides, and non-sulfonated olefinic condensation products. The great majority of the organic compounds in acid waste are the sulfonic acids, namely the sulfonic acids of different polycyclic organic compounds, aromatic hydrocarbons, compounds containing oxygen, sulfur and nitrogen, as well as nitrogen bases and naphthenic acid. The acid waste material creating the greatest disposal problem is the acid sludge which contains about 25–80% sulfuric acid and about 10–60% carbon. Spent acids contain about 70–90% sulfuric acid and about 1–10% carbon. Alkylation acids generally contain about 85–95% sulfuric acid and about 2–8% carbon.

The disposition of acide waste material has been a major problem for almost a century. Although such material quite often contains many potentially valuable constituents, cost of recovery frequently exceeds the value of the products. In some circumstances in the past acid waste was conveniently disposed of by dumping in rivers or streams. As might be expected the pollution problem was staggering and this practice was enjoined by both legislation and courts. Alternate methods such as accumulation on the plant site created equally undesirable conditions. Without adequate means of disposal acid waste is generally stored, invariably at considerable expense. A variety of methods has been suggested for treatment of acid waste with many concerned primarily with rendering it disposable. Of these few have recovered sufficient of the waste constituents or have otherwise been efficient enough to gain acceptance. One method used in the art involves contacting acid sludge with steam and hot water which, after considerable agitation, separates the sludge into organic and acid layers. Generally, this hydrolysis method accomplishes only a partial separation of the sulfuric acid and hydrocarbon material in the sludge. Further, the recovered acid has been diluted by the steam and water used in the hydrolysis and is of low strength, usually 30–60%, and requires expensive concentration for reuse, and still, it contains appreciable quantities of hydrocarbons which color the acid and tend to carbonize if the acid is further concentrated by the addition of strong sulfuric acid. In addition, hydrolysis tars also carry small amounts of free acid, are extremely viscous and have practically no value. Another method thermally decomposes acid waste at high temperature, on the order of 1600–2000° F. in the presence of air. The sulfur dioxide produced by this method is usually so diluted with residual oxygen, nitrogen, and carbon dioxide that the production of sulfuric acid therefrom involves harsh penalties from higher equipment cost or decreased plant capacity. Another common method involves decomposition at intermediate temperatures. In this process the acid content of the waste is reduced by hot coke and its combustion products to form sulfur dioxide at temperatures in the range of 700–900° F. and higher. At these temperatures, some cracking of the hydrocarbon content of the acid waste occurs and the sulfur dioxide decomposition product becomes contaminated with volatile, non-condensable hydrocarbons as well as diluted by other impurities such as carbon dioxide which inevitably result from decomposition at these temperatures. Furthermore, such processes require the handling of large amounts of coke involving large and expensive equipment. Various other types of processes have been suggested using lower temperatures in the range of 250–750° F. However, none appears to have gained commercial recognition and all have one or more major disadvantages in that they require extensive pre-treatment of the acid waste, use gaseous heating means which dilute the sulfur dioxide product, or involve two or more stages for complete decomposition. In addition, most of the processes are limited to specific types of acid waste, or portions thereof, while others consume large amounts of valuable oil products which are converted, at best, to yield only low grade by-product fuels.

Superficially, the decomposition of sulfuric acid waste material would appear quite simple involving merely the application of heat to the waste acid to liberate sulfur dioxide for reconversion into sulfuric acid. Practically, as evidenced by long history in the art, regeneration of acid from sludge in an efficient, economical manner is a difficult problem. A major difficulty in one approach to thermal decomposition of acid sludge is the formation of solid carbonaceous material. When acid sludge is decomposed in externally heated reaction zones the solid carbonaceous material formed during decomposition deposit on the heating surfaces reducing the heat transfer and making the operation unsatisfactory. Further, the carbonaceous particles are of low value and their extremely small size makes recovery difficult and uneconomical. Other methods of this general type have included introduction of a gaseous or vaporous heating medium into a body of acid sludge, but this had the detrimental effect of diluting the desired sulfur dioxide gas and further did not avoid settling of solid carbonaceous material formed during the decomposition on the chamber walls.

An object of the present invention is to provide an efficient and economical method for the decomposition of sulfuric acid waste material.

Another object is to provide a method for the recovery of uncontaminated and substantially 100% sulfur dioxide from sulfuric acid waste.

A further object is to provide an improved and efficient heating method for effecting the decomposition of sulfuric acid waste.

Another object is to provide a single heating means which may be continuously recycled in the process and from which transported solid carbonaceous decomposition products can be readily separated.

A still further object is to provide a new and improved method for decomposing acid waste to form carbonaceous by-product material of improved quality and which can be efficiently and economically recovered from the operation.

These and other objects and advantages will be apparent from the following description and accompanying drawing.

Carbon formation in decomposition of acid waste material has been a troublesome problem in the industry as found by prior art workers. Attempts were made by various expedients to minimize the formation and concentration of the by-product carbonaceous material in the reaction zone without success. Applicants' approach to the solution of the carbon problem is in a direction opposed to the prior art in that solid carbonaceous material is deliberately added to the reaction to maintain a relatively high level or concentration of this material in the reaction zone.

In accordance with this invention it has been found that acid sludge decomposition may be accomplished by treating the acid sludge under a combination of specific conditions involving continuously feeding acid sludge into an enlarged unheated reaction zone, simultaneously feeding a recycled heat transfer oil non-reactive (under the process conditions) to any constituent of the acid sludge including the sulfuric acid content at an elevated temperature sufficient to maintain the body of acid waste and transfer oil within said zone at a decomposition temperature within the range of 300° F. to 550° F., said non-reactive heat transfer oil generally boiling within the range of about 600–1000° F. and being preferably a paraffinic oil within the boiling range of about 700–900° F., maintaining the ratio of heat transfer oil to acid waste in said zone at about at least 3:1 by weight, preferably about 5:1 to 6:1, continuously introducing along with said non-reactive transfer oil a quantity of recycled suspended carbonaceous particles sufficient to maintain the concentration of carbonaceous particles in the reaction zone within the range of at least 6% but less than about 35% by weight of the heat transfer oil, preferably about 10–20 percent by weight, maintaining said body of acid waste and transfer oil in the reaction zone at a temperature of about 300–550° F., preferably 420–480° F., for a period of about 3–60 minutes, preferably 10–30 minutes, to decompose substantially the entire sulfuric and sulfonic acid content of the waste material by reduction with essentially only the hydrogen content of the organic constituents of the waste while converting said organic constituents to solid carbonaceous particles and agglomerating particles present in the reaction zone to form larger particles, continuously releasing from the reaction zone a gaseous stream of sulfur dioxide and water vapor, separating the sulfur dioxide from the water vapor, discharging a gaseous product stream of substantially 100% sulfur dioxide (dry basis), continuously withdrawing from the reaction zone a liquid product stream of non-reactive transfer oil containing suspended carbonaceous particles, treating the withdrawn non-reactive transfer oil containing suspended carbonaceous particles to separate a portion of the larger carbonaceous particles from the treated transfer oil, the separated particles preferably representing a major portion of the particles of the treated transfer oil which are greater than 150 mesh, desirably greater than 100 mesh (Tyler screen series), recovering said separated particles, reheating the transfer oil containing unseparated particles of smaller size than those separated from said transfer oil, and returning the reheated non-reactive transfer oil containing unseparated carbonaceous particles for introduction into the reaction zone.

Important features in operation of the present invention are control of the concentration and particle size of the solid carbonaceous material in the reactor. It has been found that control of the particle size of the carbonaceous solids is a most important factor, both from the standpoint of effective operation of the process and quality of the carbonaceous material recovered. Particle size of the carbonaceous material formed on decomposition of the acid waste is ordinarily of relatively fine size. As a result acid waste decomposition and product recovery are relatively inefficient and the carbonaceous product itself difficult to handle and limited in use. It has been found that quality and particle size of the carbonaceous particles formed on decomposition may be enhanced by maintaining in the reaction zone a relatively high concentration of carbonaceous material within the range of about 6% to 35% by weight of the heat transfer oil. By maintaining a minimum concentration of at least about 6% carbonaceous particles it has been found that the relatively fine particles in the reaction zone condense or agglomerate to form larger particles which can be readily separated from the transfer oil. Further, the carbonaceous particles agglomerate in the reaction zone to form larger particles which are relatively porous making the recovered particles valuable as a starting material from which high quality activated carbon may be readily produced by conventional methods.

Maintenance of desired solids concentration in the reaction zone and recovery of the solid carbonaceous particles may be conveniently accomplished in accordance with the invention by separating and recovering from the product stream withdrawn from the reaction zone a portion of the larger particles, preferably a majority of particles greater than 150 standard mesh in size, desirably greater than 100 mesh, and recycling to the reactor the remaining product stream containing unseparated particles of smaller average size than those separated from the stream. In this manner particles of larger more desired size and of improved quality may be continuously recovered while continuously maintaining the concentration of particles in the reaction zone at a relatively high level within the range of about 6–30% at which the relatively fine particles act as "seed crystals" or "nuclei" for agglomeration of the particles to form a relatively porous carbonaceous product of larger more desired particle size. Separation of the larger particles to be recovered from the heat transfer oil containing smaller particles to be recycled is preferably and conveniently accomplished in two stages by dividing the liquid product stream from the reaction zone into a first stream and a second concentrated stream containing a greater amount of larger particles than said first stream, preferably at least twice the amount of particles greater than 150 mesh in size, desirably greater than 100 mesh, separating from said second stream a major portion of the larger particles in said stream, preferably a majority of the particles greater than 150 mesh in size, desirably greater than 100 mesh, recovering the separated particles, reheating the heat transfer oil containing unseparated particles of smaller average size than the separated particles, and returning said reheated transfer oil for introduction into the reaction zone. The more preferred procedure involves combining the remaining portion of the second stream containing unseparated particles of smaller average particle size with the first stream, reheating the combined stream of heat transfer oil containing unseparated particles, and returning said combined reheated stream of non-reactive transfer oil containing carbonaceous particles for introduction into the reaction zone. The process also has the advantage of permitting use of conventional equipment in treating large volumes of transfer oil for removal of the solid carbonaceous products.

Decomposition of the acid waste is carried out under conditions such that the decomposition temperature is within the range of about 300° F. to 550° F. At temperatures of reaction above about 550° F. a variety of undesirable reactions take place including the decomposition of mercaptans and the formation of hydrogen sulfide which contaminates the gaseous sulfur dioxide product. In addition, at temperatures substantially above 550° F. the hydrocarbons tend to crack and form more volatile hydrocarbons which would also contaminate the $SO_2$ product. At temperatures below 300° F. the reaction rate is too low and further results in incomplete conversion of the sludge into the desired $SO_2$. The preferred temperatures of about 420–480° F. are those at which we have found that decomposition proceeds most rapidly and efficiently.

Another factor in operation of the process of the invention is control of the initial ratio of sulfuric and sulfonic acids to the organic constituents in the waste acid so that the hydrogen contained in the latter is adequate for complete reduction of the sulfuric and sulfonic acids. The so-called "acid sludges" generally contain sufficient hydrogen in their own organic constituents, which are principally high molecular weight aromatic compounds, to reduce all sulfuric and sulfonic acids present. On the other hand "spent acids" and "alkylation acids" never have in themselves the quantity of hydrogen needed for this purpose. In the operation the necessary hydrogen for the "spent acid" and "alkylation acid" decomposition is furnished by premixing these materials with a relatively high carbon content "acid sludge" or any inexpensive petroleum, coal tar or other organic residue containing aromatic or naphthenic hydrocarbons. Generally, the acid waste prior to introduction into the process should have a mol ratio of total aromatic and naphthenic hydrogen ($H_2$) to sulfuric acid equivalent of at least 1:1, but not exceeding 6:1. A convenient method of determining the total aromatic and naphthenic hydrogen, hereinafter also referred to as "available hydrogen," is by combustion of a sample of the sludge to determine carbon content. Mols of available hydrogen may then be conveniently approximated by dividing the carbon content by a factor of 20. The sulfuric acid equivalent is the sum of the free sulfuric acid plus the actual sulfonic acid content of the sludge. The actual sulfonic acid content may be approximated by multiplying the difference between the total acidity (as $H_2SO_4$) and the free sulfuric acid content of the sludge by a factor of 1.65. Total acidity may be readily determined by titration with caustic using a pH meter. Free sulfuric acid in the sludge may be determined by conventional aniline precipitation procedure. Below the minimum 1:1 ratio the sulfuric acid content is not completely converted and the solid by-product material less suitable for agglomeration in the reaction zone. Higher proportions of hydrogen than the specified 6:1 mol ratio may not yield the desired solid carbonaceous by-products. Preferred ratios of hydrogen to sulfuric acid equivalent are within the range of about 3:1 to 5:1. The hydrogen-sulfuric acid ratio is also a factor bearing on particle size of the solid carbonaceous material produced during decomposition of the acid waste. Generally, the high hydrogen-sulfuric acid ratios tend to create larger particles and for this purpose hydrogen-sulfuric acid ratios of about 4:1 to 5:1 are considered more desirable.

A most significant factor in the operation of the process is the use of a non-reactive heat transfer oil. This oil should be non-reactive with the contents of the acid waste and specifically unaffected by the sulfuric acid under the prescribed conditions. In practice we have found that a paraffinic oil having a boiling range within the range of 600–1000° F. is eminently suitable. Paraffinic oil suitable for use in the process can be obtained from higher molecular weight petroleum fractions. Illustrative types of such petroleum fractions include paraffin "slop oil," waxy stock and partially refined waxy stock. Generally, the suitable petroleum fractions are composed of high molecular weight paraffins and long alkyl chain cyclic hydrocarbons which are predominantly paraffinic in nature. Minor portions, usually less than 1–5%, of reactive material which may be admixed in such petroleum fractions are decomposed during the first cycle leaving the transfer oil essentially non-reactive under the process conditions with the contents of the acid waste. The paraffinic oil will not vaporize at the elevated temperatures required during the reaction and will not be subject to any significant degree of cracking at the temperature normally maintained during reaction, about 300–550° F. and during preheating, about 500–600° F. as cracking produces volatiles which contaminate the sulfur dioxide product and result in depreciation of the heating oil. The amount of heating oil employed is at least three times as great as the amount of acid sludge treated. Preferably the proportion of heating oil should be 5–6 times by weight of the acid sludge. The upper limit of the ratio of heat transfer oil to acid waste is less important and primarily a matter of maintaining the desired concentration of carbonaceous solids in the reactor. For efficient operation the ratio of nonreactive transfer oil to acid waste generally should not exceed about 10 to 1. Such oil also acts as a dispersion and suspension medium in which agglomeration of the solid carbonaceous particles takes place during the decomposition reaction.

The accompanying drawing diagrammatically illustrates one method of carrying out the present invention. Referring to the drawing, acid waste material is continuously withdrawn from acid waste storage tank 1 through line 2 by pump 3 which may be any suitable type such as a Viking pump. The acid waste is fed by pump 3 through line 4 and evenly distributed over reaction mixture in reactor 5 by means of spray nozzle 6 with water jacket 7 being provided to prevent premature reaction in nozzle 6. Reactor 5 is an enlarged unheated vessel preferably insulated to minimize heat losses and of sufficient size to maintain a substantial body of hot heat transfer oil into which the acid sludge is introduced. The reactor is equipped with suitable stirrer of the turbine type or of the type having paddle blades 8 rotating on shaft 9 to maintain the reaction mixture in constant agitation to assure complete mixing of liquid contents and liberation of gaseous decomposition products. If desired, a series of baffles 10 may be provided to further assure sufficient agitation. Reactor 5 is enclosed to prevent escape of gaseous sulfur dioxide product from the reaction zone and may be constructed of any suitable material including mild steel, as corrosion from wet sulfur dioxide is not a problem at the operating temperatures used in the process.

The acid waste entering reactor 5 is controlled to have a mol ratio of aromatic and naphthenic hydrogen to sulfuric acid equivalent of at least 1:1 but not exceeding 6:1, preferably a ratio within the range of 3:1 to 5:1. Simultaneously, a non-reactive heat transfer oil, preferably a paraffinic oil, is continuously fed into the reactor from line 11 and admixed under agitation with the contents of the reactor including the sludge entering through line 4. The amount of acid waste and heat transfer oil fed to the reactor is carefully controlled so that the amount of heating oil is at least 3 times that of the acid sludge undergoing treatment, the proportion of transfer oil to sludge being preferably 5:1 to 6:1 by weight of the acid sludge. The temperature of the heat transfer oil entering the reactor is such that the reaction temperature in the reactor will be maintained within the range of about 300–550° F., preferably within the range of 420–480° F. The heat transfer oil generally enters reactor 5 below the level of the reaction mixture (to avoid loss of those constituents having high vapor pressures) and at a temperature of about 100–150° F. above the reaction temperature. In carrying out the invention, the non-reactive heat transfer oil is continuously recycled in the process and is preheated in a suitable oil heater 12 to the desired temperature, generally a temperature of about 450° F. to 650° F. and preferably a temperature within the range of about 550° F. to 620° F. The recycled transfer oil is collected in surge tank 13 and is fed to heater 12 by withdrawing the transfer oil from tank 13 through line 14 to pump 15 which feeds the oil through line 16 to heater 12 at a residual temperature of about 300–450° F. Oil heater 12 may be any suitable conventional type such as a pipe still or a heat exchanger having a plurality of enclosed heating tubes 17 around which hot combustion gases from a fuel gas entering through line 18 pass in heat exchange relationship to the transfer oil passing through the heater in tubes 17.

As a feature of the invention, the heat transfer oil withdrawn from surge tank 13 and fed to reactor 5 contains a controlled amount of recirculated carbonaceous solids previously formed on decomposition of the acid waste and remaining in the transfer oil after separation of a portion of the larger particles exiting the reaction zone. The amount of carbonaceous particles recycled in the process is carefully controlled to maintain the total concentration of carbonaceous material in the reactor below about 35% by weight but at least about 6% by weight of the body of heat transfer oil, and preferably in the range of about 10–20% by weight of the transfer oil. A majority of the recycled carbonaceous particles preferably have a size less than 150 standard mesh and desirably a size less than about 100 mesh. At a minimum solids content of about 6% by weight of the heat transfer oil the carbonaceous solids act as nuclei with which the fine particles produced on decomposition of the acid waste combine to form larger porous carbonaceous particles of desired size.

The heat transfer oil with suspended recycled particles is thoroughly and rapidly admixed under agitation with the acid waste entering the reactor to raise the temperature of the waste material to the decomposition temperature. The acid waste material entering the reactor is thereby chemically decomposed at a temperature of about 300–550° F., preferably at about 420–480° F., by utilizing the hydrogen in the organic constituent of the sludge to reduce the sulfuric and sulfonic acid content to $SO_2$ and water. By controlling the mol ratio of hydrogen to sulfuric acid equivalent within the range of 1:1 to 6:1, preferably 3:1 to 5:1, in the presence of the heating oil which is non-reactive with any constituent in the reactor including the sulfuric acid, the fine carbonaceous particles formed on decomposition will combine at the specified solids concentration to form the relatively larger porous particles which become suspended in the heat transfer oil. The decomposition in reactor 5 is rapid and generally complete in 1–3 minutes, reaction time generally varying with the type of acid waste material being treated. Samples withdrawn from the reactor after 1–3 minutes will show a slight acidity in the solid carbonaceous decomposition product and to assure complete neutrality residence time may be extended up to about 60 minutes, a preferred residence of 10–15 minutes being generally suitable to assure non-acidity of the product.

The decomposition of the acid waste results in the production of a gaseous mixture of sulfur dioxide and water which exits reactor 5 through line 19. This gaseous mixture passes through line 19 to condenser 20, which may be of any suitable type such as a "Karbate" condenser, where the water present as steam is condensed and separated from the sulfur dioxide. Under the carefully controlled specified conditions of the reaction, the gas stream exiting reactor 5 is free of $SO_3$ (vaporized sulfuric acid) and free of normally volatile hydrocarbons which would contaminate the $SO_2$ product. As a result, substantially 100% sulfur dioxide exits condenser 20 through line 21 and may be purified further and liquified or passed directly to the sulfuric acid plant. The water and oil collecting in the bottom of condenser 20 exits through line 22 and enters the top of oil-water separator 23 which may be any conventional type such as a settling tank. Oil-water separator 23 is equipped with an oil draw-off line 24 located at about the middle and water-draw-off line 25 located near the bottom. The water entering through line 22 may contain a small amount of heat transfer oil which has been steam distilled from the body of hot heat transfer oil in reactor 5, and which forms the top layer in oil-water separator 23 and may be conveniently withdrawn through draw-off line 24 to pump tank 26 for admixture with the oil stream exiting reactor 5. Water collecing in the bottom of oil-water separator 23 is withdrawn for disposal through draw-off line 25.

A liquid product stream containing the heat transfer oil and suspended carbonaceous solids is continuously discharged from reactor 5 and flows by gravity to pump tank 26 through line 27. In the more preferred operating procedure in which substantially all the acid content of the waste is decomposed, the suspension of carbonaceous material in the heat transfer oil will show substantially no acidity and will be substantially free of non-solid hydrocarbons contained in the acid waste being treated. The transfer oil in pump tank 26 has a temperature of typically about 400–440° F. and is in condition for separation and recovery of the suspended carbonaceous solids.

In a preferred procedure for recovery of the solid carbonaceous product the product stream is withdrawn from tank 26 through line 28 and fed by action of pump 29 through line 30 to a centrifugal classifier 31. Classifier 31 may be any suitable commercial type such as a "Dorr-clone." In classifier 31 the heat transfer oil with suspended solids is divided into separate streams having different particle size distribution of the carbonaceous solids. A major portion of the heat transfer oil containing solids of relatively small particle size distribution is discharged from classifier 31 through line 32 and returned to surge tank 13 for recycle in the process. A lesser portion of the transfer oil in which particles of larger size distribution are concentrated is discharged from separator 31 through line 33 and passed to separator 34 for second-stage separation and recovery of the carbonaceous product. Separator 34 may be any suitable separator such as a centrifugal separator, for example a Dorr-Oliver "Mercone." Separation and recovery of the solid carbonaceous product may of course also be accomplished by single-stage separation.

The heat transfer oil entering second-stage separator 34 through line 33 has generally a weight ratio of about 1:3 to 1:7 parts by weight carbonaceous solid to parts by weight heat transfer oil. In separator 34 a portion of the carbonaceous solids containing preferably a majority of particles greater than 150 standard mesh in size, desirably greater than 100 standard mesh, is removed from the heat transfer oil and discharged from separator 34 through line 35. The separated heat transfer oil having suspended therein the remaining particles of which a majority are preferably less than 150 standard mesh, desirably less than 100 mesh, is discharged from separator 34 through line 36 and returned to surge tank 13 for recycle in the process. The separate streams of heat transfer oil with the finer suspended particles from classifier 31 and separator 34 are combined in surge tank 13 for recycle in the process. As shown, a portion of the transfer oil in surge tank 13 may be recycled to pump tank 26 through line 45 in situations where desired or required to maintain sufficient material in pump tank 26 to operate classifier 31 at a maximum capacity. Alternately, all or a portion of recycle streams from either separator may be transferred directly to pump tank 26 for this purpose.

The solid carbonaceous particles of desired size which are discharged from separator 34 contain a moderate amount of heat transfer oil adsorbed therein, generally about 30% by weight of the solids recovered, and are passed from line 35 to wet coke feed screw conveyor 37 which feeds the particles to suitable apparatus for removal of the adsorbed transfer oil. This is preferably accomplished by feeding the particles to a stripper 38 which may be any conventional type adapted to remove the adsorbed oil from the carbonaceous solids by flow of a high temperature gas stream in contact with the particles. In the more preferred procedure a fluidized bed of the particles is maintained in stripper 38 under the action of steam introduced through line 39. Generally, stripper 38 is operated at a relatively high temperature of about 700–800° F. which may be maintained by combustion of air and fuel gas introduced through line 40 into a suitable external heating zone 41 which surrounds stripper 38, substantially as shown. The dry particles with the adsorbed transfer oil removed are discharged from stripper 38 through product screw conveyor 42 for transport to storage or further processing. Heat transfer oil recovered from the particles together with steam used in the stripping operation exit stripper 38 through line 43 and are passed to a suitable condenser 44 from which the transfer oil and water are returned to the process at oil-water separator 23 through line 46. Lightweight volatile hydrocarbons which may be present due to cracking of the transfer oil at the high temperatures employed in stripper 38 are released at condenser 44 and removed from the process for combustion through line 47.

The process is designed to operate with maximum efficiency at substantially atmospheric pressure. As reactor 5 is enclosed, normal operation will build up nominal pressures. The process may also be operated under superatmospheric pressures taking advantage of higher pressures to liquefy the $SO_2$ product by cooling only.

The following example in which parts and percentages are by weight illustrates the practice of the present invention.

A mixture of acid sludge derived from the sulfuric acid treatment of a lubricating oil fraction had the following composition:

| | Percent |
|---|---|
| Total acidity (as $H_2SO_4$) | 6.66 |
| Free $H_2SO_4$ | 63.5 |
| Total hydrocarbons | 23.0 |
| Total carbon | 19.1 |
| Free $H_2O$ | 8.4 |
| Organic sulfur (approx.) | 2.0 |
| Organic hydrogen (calculated) | 1.9 |

This acid sludge was continuously fed at a temperature of about 80° F. and rate of about 125 parts into an enlarged insulated reaction vessel equipped with a stirrer for agitation of the reaction mixture. Simultaneously, a paraffinic oil having a boiling range of about 704–880° F. and preheated to a temperature of about 560° F. was continuously fed into the reaction vessel at a rate of about 786 parts. The paraffin contained 72 parts recycled carbonaceous solids making the total weight of the paraffinic oil about 858 parts. The paraffinic oil employed had the following specification.

| | |
|---|---|
| Gravity, ° API | 37.4 |
| Viscosity, SSU/210° F. | 39.6 |
| Gel aromatics, percent | 6.6 |
| Boiling range ° F. | 704–880 |
| Carbon type: analysis, percent— | |
| $C_{paraffinic}$ | 78 |
| $C_{naphthenic}$ (combined with long alkyl side chains) | 21 |
| $C_{aromatic}$ | 1 |

The weight ratio of heat transfer oil to acid sludge fed to the reactor was about 6:1 and the total mixture continuously present in the reactor filled approximately ⅓ the volumetric capacity of the reactor. The body of acid sludge and paraffinic oil containing recycled particles was maintained in the reaction vessel under constant agitation and at a temperature of about 470° F. under which conditions the acid sludge was decomposed with the formation of a gaseous mixture of $SO_2$ and water vapor which was continuously released from an outlet in the top of the reactor. This mixture of $SO_2$ gas and water vapor was passed to a condenser in which the water vapor was condensed and separated from the $SO_2$ gas. About 54 parts of $SO_2$ containing trace amounts of water vapor was released from the condenser and recovered for conversion into $H_2SO_4$ in the sulfuric acid process. A liquid stream containing about 44 parts of water and 21 parts of paraffinic oil distilled over with the gas mixture entering the condenser was withdrawn from the condenser and passed to an oil-water separator from which the water was discharged from the system and the oil returned to a pump tank for reuse in the process. About 863 parts of a liquid product stream of paraffinic oil and suspended carbonaceous solids was continuously withdrawn from a lower portion of the reaction vessel. The carbonaceous solids content of the product stream was about 12.8% by weight of the paraffinic oil. The product stream was passed to a pump tank and admixed with the paraffin oil returned from the oil-water separator and a 248 parts stream recycled from a surge tank of which 20.8 parts was carbonaceous solids. From the pump tank there was continuously withdrawn a stream of paraffin oil and suspended carbonaceous solids which was fed by the action of a slurry pump to an intermediate portion of a "Dorrclone" classifier. The feed rate to the classifier was about 1142 parts of which 118.3 parts was carbonaceous solids. Particle size in the feed varied from about 20 standard mesh to minus 325 mesh with 42.7 percent less than 150 mesh and 54.1 percent less than 100 mesh. The liquid stream entered the classifier at a temperature of about 440° F. A stream of paraffin oil containing the finer carbonaceous solids was discharged from the classifier at a rate of about 800 parts and fed to a surge tank for recycling in the process. About 58.4 parts of this stream was carbonaceous solids of which about 76.5% were less than 150 standard mesh and 83.4% less than 100 mesh. The remaining portion of the stream fed to the classifier was discharged therefrom at a rate of about 342 parts and passed to the inlet of a centrifugal separator. About 59.9 parts of this stream was carbonaceous solids. 36.4 parts of carbonaceous solids containing 11 parts of adsorbed heat transfer oil was discharged from the separator. About 64.6% of these carbonaceous solids had a particle size greater than 100 mesh with at least 55% greater than 150 mesh. These particles were then fed through a screw conveyor to a fluidized stripping column and subjected to the action of steam at a temperature of about 720° F. to remove adsorbed transfer oil from the solids. 25.5 parts of solid carbonaceous product was then withdrawn from the stripping column through a screw conveyor and recovered. The paraffin oil removed from the particles in the stripping column was returned to the oil-water separator at a rate of about 10.9 parts. The transfer oil from which the carbonaceous product was separated in the centrifugal separator was passed to the surge tank where the oil was admixed with the oil entering the surge tank from the classifier. Oil discharged from the separator contained about 34.4 parts of fine suspended carbonaceous solids and this mixture was fed to the surge tank at a rate of about 305.6 parts. About 75.7% of these solids was less than 150 standard mesh in size with 88.4% being less than 100 mesh. Mechanical action in the separators resulted in some breakdown of larger particles. The paraffin oil collected in the surge tank for recycling contained about 9.25% solid carbonaceous solids by weight of the oil. This oil together with suspended carbonaceous particles was withdrawn from the surge tank and pumped at a temperature of about 400° F. to the heater for recycling to the reactor.

Although certain preferred embodiments of the invention have been disclosed for purpose of illustration, it will be evident that various changes and modifications may be made therein without departing from the scope and spirit of the invention.

We claim:

1. A process for the decomposition of sulfuric acid waste material which comprises, (a) feeding sulfuric acid waste material into an enlarged reaction zone, the acid waste material having a mole ratio of available hydrogen to sulfuric acid equivalent within the range of at least 1:1 to about 6:1, (b) simultaneously introducing into said zone a recycled stream of heat transfer oil non-reactive to the acid waste including the sulfuric acid content, (c) regulating the heat transfer oil to acid waste in said zone in the ratio of at least 3:1 by weight, (d) introducing into the reaction zone recycled suspended carbonaceous particles sufficient to maintain the concentration of carbonaceous particles in the reaction zone within the range of at least about 6% but less than about 35% by weight of the heat transfer oil, (e) said transfer oil being introduced into the reaction zone at a temperature sufficient to maintain the body of acid waste and transfer oil within said zone at a decomposition temperature within the range of about 300–550° F., (f) maintaining said body of acid waste and transfer oil in the reaction zone for a period of about 3–60 minutes to decompose substantially the entire sulfuric and sulfonic acid content of the acid waste by reduction with the hydrogen content of the organic constituents of the waste while converting said organic constituents to solid carbonaceous particles and agglomerating particles in the reaction zone to form larger particles, (g) releasing from the reaction zone a gaseous stream of sulfur dioxide and water vapor produced by the decomposition, (h) withdrawing from the reaction zone a liquid product stream composed of non-reactive transfer oil and suspended carbonaceous particles, (i) separating a portion of larger carbonaceous particles above 150 mesh from said liquid product stream, (j) reheating the stream of transfer oil containing unseparated particles of smaller size, and (k) returning said reheated stream of non-reactive heat transfer oil containing carbonaceous particles to the reaction zone.

2. A process for the decomposition of sulfuric acid waste material which comprises (a) feeding sulfuric acid waste material into an enlarged reaction zone, the acid waste material having a mole ratio of available hydrogen to sulfuric acid equivalent within the range of at least 1:1 to about 6:1, (b) simultaneously introducing into said zone a recycled stream of heat transfer oil non-reactive to the acid waste including the sulfuric acid content, (c) regulating the heat transfer oil to acid waste in said zone in the ratio of at least 3:1 by weight, (d) introducing into the reaction zone recycled suspended carbonaceous particles sufficient to maintain the concentration of carbonaceous particles in the reaction zone within the range of at least about 6% but less than about 35% by weight of the heat transfer oil, (e) said transfer oil being introduced into the reaction zone at a temperature sufficient to maintain the body of acid waste and transfer oil within said zone at a decomposition temperature within the range of about 300–550° F., (f) maintaining said body of acid waste and transfer oil in the reaction zone for a period of about 3–60 minutes to decompose substantially the entire sulfuric and sulfonic acid content of the acid waste by reduction with the hydrogen content of the organic constituents of the waste while converting said organic constituents to solid carbonaceous particles and agglomerating particles in the reaction zone to form larger particles, (g) releasing from the reaction zone a gaseous stream of sulfur dioxide and water vapor produced by the decomposition, (h) withdrawing from the reaction zone a liquid product stream composed of non-reactive transfer oil and suspended carbonaceous particles, (i) dividing said liquid product into two portions with the first portion containing a greater concentration of larger particles than the second portion, (j) separating the larger particles from the first portion, (k) recovering the separated larger particles, (l) reheating heat transfer oil containing unseparated particles of small size, and (m) returning said reheated non-reactive heat transfer oil containing small size carbonaceous particles for introduction into the reaction zone.

3. A continuous process for the decomposition of sulfuric acid waste material which comprises, (a) continuously feeding sulfuric acid waste material into an enlarged reaction zone, the acid waste material having a mole ratio of available hydrogen to sulfuric acid equivalent within the range of at least 1:1 to about 6:1, (b) simultaneously introducing into said zone a recycled stream of heat transfer oil non-reactive to the acid waste including the sulfuric acid content, (c) regulating the heat transfer oil to acid waste in said zone in the ratio of at least 3:1 by weight, (d) continuously introducing into the reaction zone recycled suspended carbonaceous particles sufficient to maintain the concentration of carbonaceous particles in the reaction zone within the range of at least about 6% but less than about 35% by weight of the heat transfer oil, (e) said transfer oil being introduced into the reaction zone at a temperature sufficient to maintain the body of acid waste and transfer oil within said zone at a decomposition temperature within the range of about 300–550° F., (f) maintaining said body of acid waste and transfer oil in the reaction zone for a period of about 3–60 minutes to decompose substantially the entire sulfuric and sulfonic acid content of the acid waste by reduction with the hydrogen content of the organic constituents of the waste while converting said organic constituents to solid carbonaceous particles and agglomerating particles in the reaction zone to form larger particles, (g) continuously releasing from the reaction zone a gaseous stream of sulfur dioxide and water vapor, (h) separating the sulfur dioxide from the water vapor, (i) discharging a gaseous product stream of substantially 100% sulfur dioxide, (j) continuously withdrawing from the reaction zone a liquid product stream composed of non-reactive transfer oil and suspended carbonaceous particles, (k) dividing said product stream into a first stream and a second stream, said first stream containing at least twice the amount of particles greater than 150 mesh as in said second stream, (l) separating from said first stream a major portion of particles greater than 150 mesh, (m) recovering said separated particles, (n) combining the remaining portion of said first stream containing unseparated particles of small particle size with said second stream, (o) reheating the combined stream of heat transfer oil containing unseparated particles, and (p) returning said combined reheated stream of non-reactive heat transfer oil containing carbonaceous particles for introduction into the reaction zone.

4. A continuous process for the decomposition of sulfuric acid waste material which comprises (a) continuously feeding sulfuric acid waste material into an enlarged reaction zone, the acid waste material having a mole ratio of available hydrogen to sulfuric acid equivalent within the range of at least 1:1 to about 6:1, (b) simultaneously introducing into said zone a recycled stream of heat transfer oil non-reactive to the acid waste including the sulfuric acid content, (c) regulating heat transfer oil to acid waste in said zone in a ratio within the range of about 5:1 to 6:1, (d) continuously introducing into the reaction zone recycled suspended carbonaceous particles sufficient to maintain the concentration of carbonaceous particles in the reaction zone within the range of 10% to 20% by weight of the heat transfer oil, (e) said transfer oil being introduced into the reaction zone at a temperature sufficient to maintain the body of acid waste and transfer oil within said zone at a decomposition temperature within the range of about 420–480° F., (f) maintaining said body of acid waste and transfer oil in the reaction zone for a period of about 10–30 minutes to decompose substantially the entire sulfuric and sulfonic acid content of the acid waste by reduction with the hydrogen content of the organic constituents of the waste while converting said organic constituents to solid carbonaceous particles and agglomerating particles in the reaction zone to form larger particles, (g) continuously releasing from the reaction zone a gaseous stream of sulfur dioxide and water vapor, (h) separating the sulfur dioxide from the water vapor, (i) discharging a gaseous product stream of substantially 100% sulfur dioxide, (j) continuously withdrawing from the reaction zone a liquid product stream composed of non-reactive transfer oil and suspended carbonaceous particles, (k) dividing said product stream into a first stream and a second stream, said first stream containing at least twice the amount of particles greater than 100 mesh as in said second stream, (l) separating from said first stream a major portion of particles greater than 100 mesh, (m) recovering said separated particles, (n) combining the remaining portion of said first stream containing unseparated particles of small particle size with said second stream, (o) reheating the combined stream of heat transfer oil containing unseparated particles, and (p) returning said combined reheated stream of non-reactive heat transfer oil containing carbonaceous particles for introduction into the reaction zone.

References Cited in the file of this patent

UNITED STATES PATENTS 1,997,980    Smith _____ Apr. 16, 1935